United States Patent
Chon et al.

(10) Patent No.: US 9,202,128 B2
(45) Date of Patent: Dec. 1, 2015

(54) IMAGE ADJUSTING APPARATUS AND METHOD, AND IMAGE STABILIZING APPARATUS INCLUDING THE SAME

(71) Applicant: HANWHA TECHWIN CO.,LTD., Changwon-Si (KR)

(72) Inventors: Je-Youl Chon, Changwon (KR); Sang-Ji Park, Changwon (KR); Ju-Han Bae, Changwon (KR)

(73) Assignee: Hanwha Techwin Co., Ltd., Changwon (KR)

( * ) Notice: Subject to any disclaimer, the term of this patent is extended or adjusted under 35 U.S.C. 154(b) by 202 days.

(21) Appl. No.: 13/687,490

(22) Filed: Nov. 28, 2012

(65) Prior Publication Data

US 2013/0177251 A1 Jul. 11, 2013

(30) Foreign Application Priority Data

Jan. 11, 2012 (KR) .................. 10-2012-0003448

(51) Int. Cl.
*G06K 9/48* (2006.01)
*G06K 9/46* (2006.01)
*G06T 7/20* (2006.01)
*H04N 5/232* (2006.01)

(52) U.S. Cl.
CPC ............... *G06K 9/46* (2013.01); *G06K 9/4671* (2013.01); *G06T 7/2033* (2013.01); *H04N 5/23254* (2013.01); *H04N 5/23267* (2013.01); *G06T 2207/10016* (2013.01)

(58) Field of Classification Search
None
See application file for complete search history.

(56) References Cited

U.S. PATENT DOCUMENTS

| 5,107,293 | A | * | 4/1992 | Sekine et al. | 396/55 |
| 2004/0096084 | A1 | * | 5/2004 | Tamoto et al. | 382/104 |
| 2006/0087707 | A1 | * | 4/2006 | Akaho | 358/518 |
| 2006/0188160 | A1 | * | 8/2006 | Matsumoto et al. | 382/190 |
| 2008/0170126 | A1 | * | 7/2008 | Tico et al. | 348/208.6 |
| 2010/0128138 | A1 | * | 5/2010 | Nitta et al. | 348/222.1 |
| 2011/0019013 | A1 | * | 1/2011 | Lin et al. | 348/208.4 |

FOREIGN PATENT DOCUMENTS

| JP | 2006094560 A | 4/2006 |
| KR | 1020060020252 A | 3/2006 |
| KR | 2020100008909 U | 9/2010 |
| KR | 1020110091381 A | 8/2011 |

* cited by examiner

*Primary Examiner* — Vikkram Bali
(74) *Attorney, Agent, or Firm* — Sughrue Mion, PLLC (57) ABSTRACT

An image stabilizing apparatus for correcting an image which is shaken due to a movement of a camera. The image stabilizing apparatus includes an image adjusting unit that includes: an image analyzing unit which compares an image frame currently input with a reference image, and if the currently input image frame is shaken, extracts a representative direction and a representative magnitude of the shaking; and an image moving unit which moves the currently input image frame by the representative magnitude in a direction opposite to the representative direction.

4 Claims, 13 Drawing Sheets

IMAGE ADJUSTING APPARATUS AND METHOD, AND IMAGE STABILIZING APPARATUS INCLUDING THE SAME

CROSS-REFERENCE TO RELATED PATENT APPLICATION

This application claims priority from Korean Patent Application No. 10-2012-0003448 filed on Jan. 11, 2012 in the Korean Intellectual Property Office, the disclosure of which is incorporated herein in its entirety by reference.

BACKGROUND

1. Field

Apparatuses and methods consistent with exemplary embodiments relate to image stabilizing by adjusting shaken images.

2. Description of the Related Art

In order to exactly detect a certain object, in particular, a moving object, by using a camera, each image has to be stabilized. However, it may be difficult to detect a certain object if captured images are shaken due to various external causes. For example, when a certain object is photographed in a state where a camera is exposed to an outside environment, the camera may slightly move due to, for example, wind or an external shock. In addition, when the camera is mounted on a movable apparatus, the camera may be shaken according to movement of the movable apparatus. Shaking of images becomes severe as more external shocks are applied to the camera, and eventually the object may not be detected exactly. An image stabilization technology is used to detect an object exactly by stabilizing the shaken images.

A patent (KR 2008-0083525; Method for stabilizing digital image which can correct the horizontal shear distortion and vertical scale distortion) discloses a related art image stabilization method. According to the related art image stabilization method, a current frame is corrected by using characterizing points extracted from the current frame and characterizing points extracted from a previous frame. According to the related art image stabilization method, however, if a shaking degree of the image increases, image correction may not be stably performed.

SUMMARY

One or more exemplary embodiments provide an image adjusting apparatus for correcting shaking of images, an image adjusting method, and an image stabilizing apparatus including the image adjusting apparatus for stabilizing shaken images.

According to an aspect of an exemplary embodiment, there is provided an image adjusting unit including: an image analyzing unit which compares an image frame currently input with a reference image, and if the currently input image frame is shaken, extracts a representative direction and a representative magnitude of the shaking; and an image moving unit which moves the currently input image frame by the representative magnitude in a direction opposite to the representative direction.

The image analyzing unit may include: an optical flow calculator which calculates an optical flow of the currently input image frame; a representative direction extractor which extracts the representative direction from the optical flow; and a representative magnitude extractor which extracts the representative magnitude from the optical flow.

According to an aspect of another exemplary embodiment, there is provided a method of adjusting an image, the method including: calculating an optical flow by comparing an image frame currently input with a reference image; extracting a representative direction and a representative magnitude of shaking of the currently input image frame from the optical flow; and moving the currently input image frame by the representative magnitude in a direction opposite to the representative direction.

If the representative direction is an X-axis direction, the currently input image frame is moved by the representative magnitude in a direction opposite to the representative direction on the X-axis, and if the representative direction is a Y-axis direction, the currently input image frame is moved by the representative magnitude in a direction opposite to the representative direction on the Y-axis. If the representative direction is a diagonal direction, the currently input image frame may be moved by (representative magnitude/$\sqrt{2}$) in a direction opposite to the representative direction on a diagonal line.

According to an aspect of still another exemplary embodiment, there is provided an image stabilizing apparatus including an image adjusting unit which: sets a characterizing point checking region in a currently input image frame; compares the currently input image frame with a reference image to determine whether the currently input image frame is shaken, based on the reference image and the characterizing point checking region; and adjusts the currently input image frame by a shaking amount if it is determined that the current image frame is shaken.

The image stabilizing apparatus may further include: a reference image setting unit which extracts an image frame which is the least shaken among a plurality of image frames included in image data taken for a certain period of time, and sets the extracted image frame as the reference image; and a characterizing point checking region setting unit which sets the characterizing point checking region by using a plurality of characterizing points in the plurality of image frames.

BRIEF DESCRIPTION OF THE DRAWINGS

The above and other aspects will become more apparent by describing in detail exemplary embodiments with reference to the attached drawings, in which:

FIGS. 3A and 3C show examples of shaken image frames.

DETAILED DESCRIPTION OF THE EXEMPLARY EMBODIMENTS

Hereinafter, exemplary embodiments will be described in detail with reference to accompanying drawings. Like reference numerals denote like elements.

Figure 1:
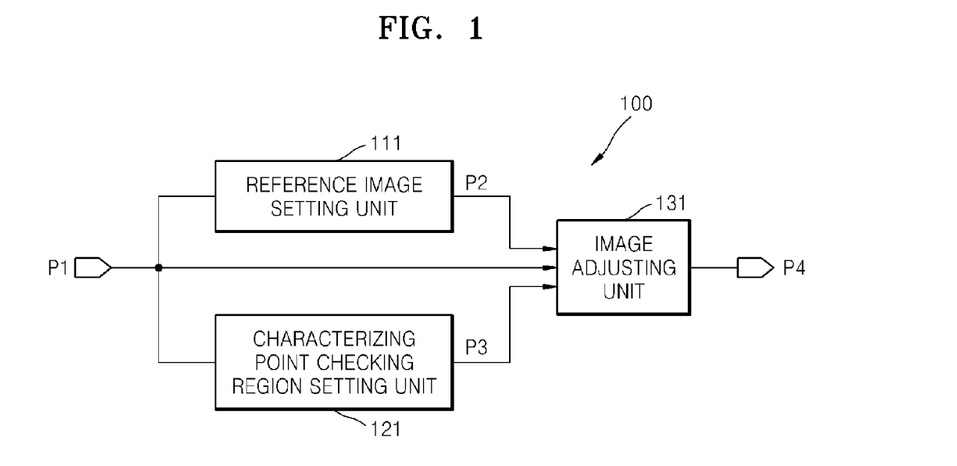
FIG. 1 is a block diagram of an image stabilizing apparatus according to an exemplary embodiment.

FIG. 1 is a block diagram of an image stabilizing apparatus 100 according to an exemplary embodiment. The image stabilizing apparatus 100 receives image data P1 that is generated by a camera (not shown) photographing an object, and stabilizes images included in the image data P1. When the object is continuously photographed by the camera in a state of being fixed, an obtained image is stabilized. However, if the object is photographed in a state where the camera is shaken, an obtained image can be a shaken image, and accordingly the photographed object may not exactly be distinguished from other objects or an environment. When an image of a photographed object is shaken as described above, the image stabilizing apparatus 100 stabilizes the image by moving the shaking object to an original position in the image.

Referring to FIG. 1, the image stabilizing apparatus 100 includes a reference image setting unit 111, a characterizing point checking region setting unit 121, and an image adjusting unit 131.

The reference image setting unit 111 extracts an image frame that is shaken least among a plurality of image frames included in the image data P1 generated by photographing the object, and then, sets the extracted image frame as a reference image. The reference image setting unit 111 outputs a signal P2 representing the reference image to the image adjusting unit 131. The reference image setting unit 111 is described in more detail below with reference to FIGS. 2 through 5.

The characterizing point checking region setting unit 121 receives the image data P1 input from outside, and sets a charactering point checking region. The characterizing point checking region setting unit 121 generates a signal P3 representing the characterizing point checking region, and outputs the signal P3 to the image adjusting unit 131. The characterizing point checking region setting unit 121 will be described in detail with reference to FIGS. 6 through 11.

The image adjusting unit 131 receives the signals P2 and P3. The image adjusting unit 131 sets the characterizing point checking region in an image included in the image data P1 that is currently input, and compares the currently input image with the reference image to adjust and stabilize the currently input image according to a shaken degree of the currently input image if the currently input image is shaken. The image adjusting unit 131 is described in more detail below with reference to FIGS. 12 through 17.

Figure 2:
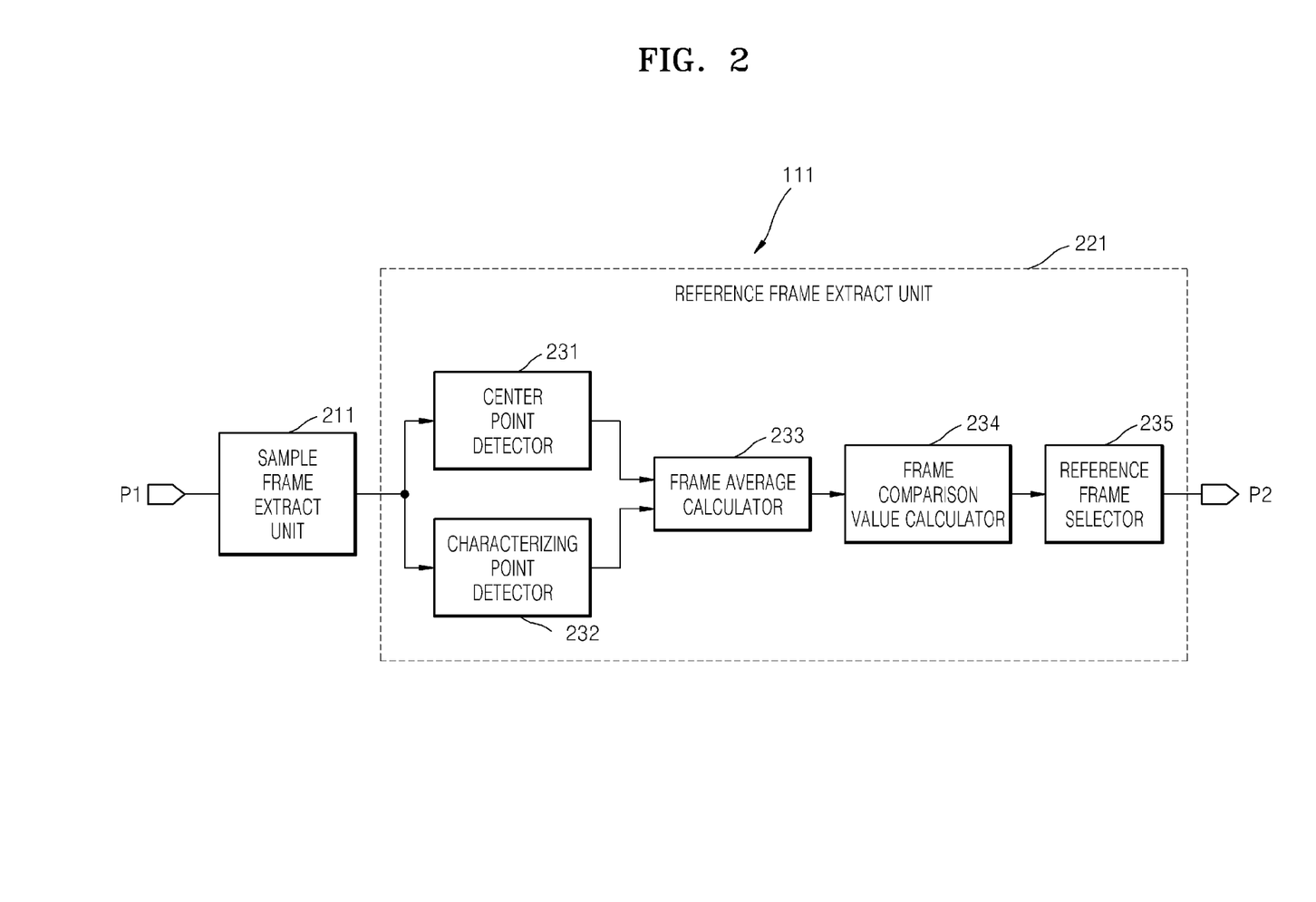
FIG. 2 is a detailed block diagram of a reference image setting unit shown in FIG. 1, according to an exemplary embodiment.

FIG. 2 is a detailed block diagram of the reference image setting unit 111 shown in FIG. 1. Referring to FIG. 2, the reference image setting unit 111 includes a sample frame extract unit 211 and a reference frame extract unit 221.

Figure 3A:
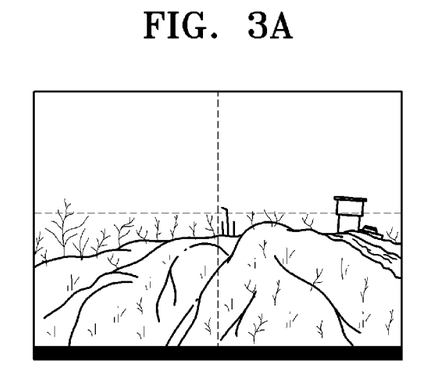
Figure 3B:
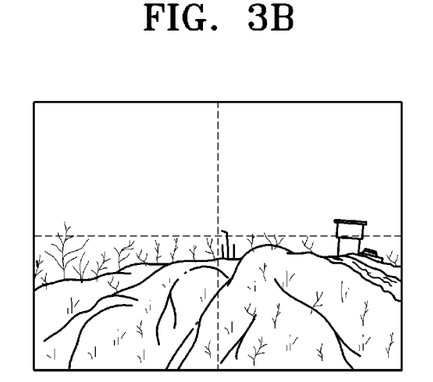
FIG. 3B shows a stabilized image frame, according to exemplary embodiments.
Figure 3C:
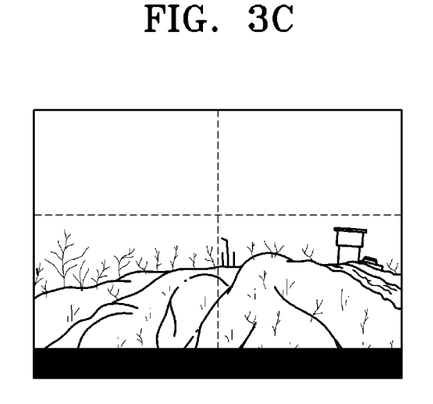

The sample frame extract unit 211 receives the image data P1 from outside. The image data P1 is generated by continuously photographing an object with the camera. The image data P1 includes a plurality of image frames. For example, the image data P1 includes a plurality of image frames as shown in FIGS. 3A-3C, each including a building located on a right side of the image frame. In FIGS. 3A-3C, the image frames of FIGS. 3A and 3C show states where images are shaken vertically relative to the image frame of FIG. 3B. The sample frame extract unit 211 extracts a plurality of image frames taken for a certain time period from the image data P1. The image data P1 includes hundreds to tens of thousands of image frames per second according to a performance of the camera. Therefore, the certain period of time may be set as one second or shorter if the shutter speed of the camera is fast, and may be set to be longer than one second if a shutter speed of the camera is slow. However, the present embodiment is not limited to this example.

The reference frame extract unit 221 receives the plurality of image frames extracted by the sample frame extract unit 211, and compares the received image frames with one another to extract the most stabilized image frame and sets the most stabilized image frame as a reference image. The most stabilized image frame is an image frame of which a shaking degree is the least.

The reference frame extract unit 221 includes a center point detector 231, a characterizing point detector 232, a frame average calculator 233, a frame comparison value calculator 234, and a reference frame selector 235.

The center point detector 231 receives the plurality of image frames from the sample frame extract unit 211, and detects center points of the plurality of image frames, respectively. That is, the center point detector 231 detects one center point from each of the plurality of image frames. The center point is located at a center of the image frame and may be represented as coordinates.

The characterizing point detector 232 receives the plurality of image frames from the sample frame extract unit 211 and detects a plurality of characterizing points in the plurality of image frames. Specifically, the characterizing point detector 232 may detect the plurality of characterizing points in each of the plurality of image frames. The plurality of characterizing points may be represented as coordinates. The image frame includes various characterizing elements, some of which may be detected as the characterizing points according to needs of a user. In order to detect the characterizing points of the image frame, a Harris' corner detection method, a scale invariant feature transform (SIFT) algorithm, or a speeded-up robust feature (SURF) algorithm may be used.

The frame average calculator 233 receives the plurality of center points detected by the center point detector 231 and the plurality of characterizing points detected by the characterizing point detector 232, and calculates a plurality of frame averages. The plurality of frame averages may be obtained by averaging distances between the center points and the plurality of characterizing points in corresponding image frames. When the number of image frames is N (N is an integer), N frame averages may be calculated.

The frame comparison value calculator 234 receives the plurality of frame averages from the frame average calculator 233 and calculates a plurality of frame comparison values. The plurality of frame comparison values may be obtained by summing up absolute values, which are obtained by subtracting frame averages of the other image frames from a frame average of each image frame. If the number of the frame averages is N, the number of the frame comparison values is also N. The frame comparison value Pk (k is an integer) of each of the plurality of image frames may be calculated by equation 1 as following:

$$Pk = abs\{Rk-R0\} + abs\{Rk-R1\} + \ldots + abs\{Rk-Rn\} \quad (1),$$

where abs denotes an absolute value, Rk is the frame average of each of the plurality of image frames, and R0 to Rn are the frame averages of the other image frames.

For example, if the number of extracted image frames for a certain period of time is five, five frame averages R0 to R4 are calculated, and five frame comparison values P0 to P4 may be obtained by equation 2 as follows.

$$P0 = abs\{R0-R1\} + abs\{R0-R2\} + abs\{R0-R3\} + abs\{R0-R4\}$$

$$P1 = abs\{R1-R0\} + abs\{R1-R2\} + abs\{R1-R3\} + abs\{R1-R4\}$$

$$P2 = abs\{R2-R0\} + abs\{R2-R1\} + abs\{R2-R3\} + abs\{R2-R4\}$$

$$P3 = abs\{R3-R0\} + abs\{R3-R1\} + abs\{R3-R2\} + abs\{R3-R4\}$$

$$P4 = abs\{R4-R0\} + abs\{R4-R1\} + abs\{R4-R2\} + abs\{R4-R3\} \quad (2)$$

The reference frame selector 235 receives the plurality of frame comparison values and selects an image frame having the smallest frame comparison value among the plurality of frame comparison values. The image frame having the smallest value is set as a reference image. The smallest frame comparison value represents that the image is least shaken.

As described above, the reference image setting unit 111 extracts a plurality of image frames for a certain period of time from the image data P1 input from outside and detects an image frame having the least degree of shaking among the extracted image frames, and sets this image frame as the reference image.

Figure 4:
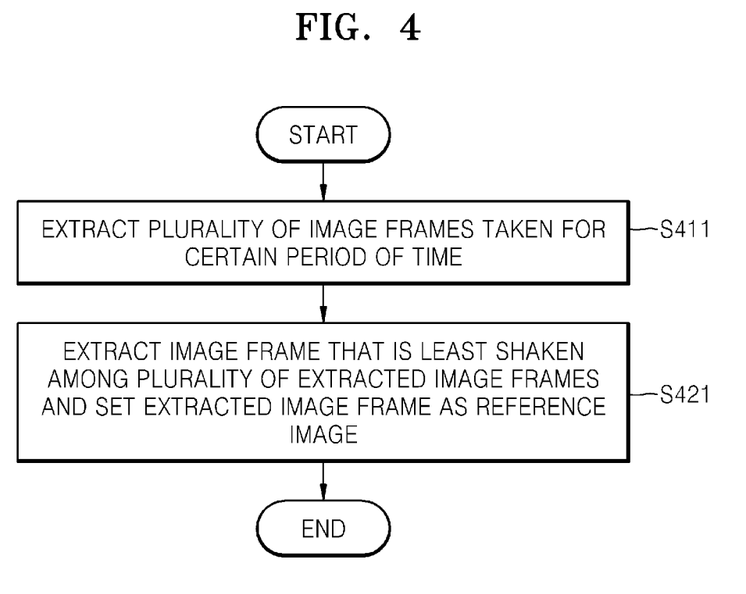
FIG. 4 is a flowchart illustrating a method of setting a reference image performed by the reference image setting unit shown in FIG. 2, according to an exemplary embodiment.

FIG. 4 is a flowchart illustrating a method of setting a reference image by the reference image setting unit 111 of FIG. 2. Referring to FIG. 2, the method of setting the reference image includes operation S411 and operation S421.

In operation S411, the reference image setting unit 111 extracts a plurality of image frames taken for a certain period of time included in image data P1 input from outside.

In operation S421, the reference image setting unit 111 compares the plurality of extracted image frames with one another to detect and set an image frame that is the most stabilized as a reference image. The most stabilized image frame denotes an image frame, of which a shaking degree is the least among the image frames.

Figure 5:
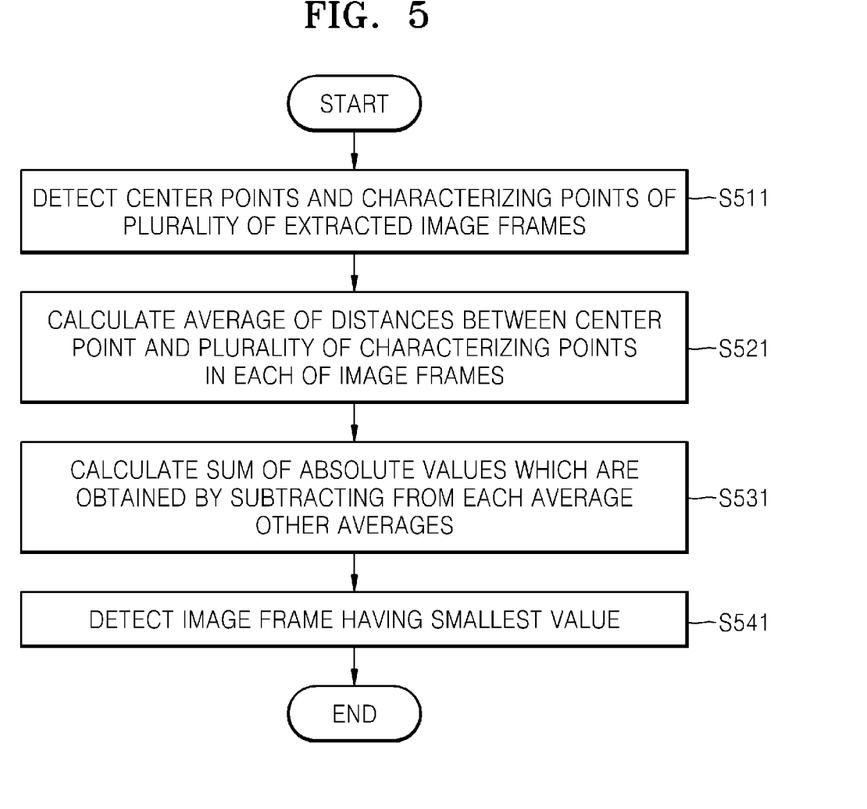
FIG. 5 is a flowchart illustrating an operation of the method shown in FIG. 4 in detail, according to an exemplary embodiment.

FIG. 5 is a flowchart illustrating the operation S421 of FIG. 4 in more detail, according to an exemplary embodiment. Referring to FIG. 5, the operation S421 of FIG. 4 includes four sub-operations S511 through S541.

In operation S511, the reference image setting unit 111 extracts a center point and a plurality of characterizing points from each of the plurality of extracted image frames.

In operation S521, the reference image setting unit 111 calculates an average of distances between the center point and the plurality of characterizing points in each of the image frames, that is, a frame average.

In operation S531, the reference image setting unit 111 calculates a sum of absolute values that are obtained by subtracting the other frame averages from a frame average of each image frame, that is, a frame comparison value. That is, the reference image setting unit 111 calculates the plurality of frame comparison values by using equation 1 above.

In operation S541, the reference image setting unit 111 detects an image frame having the smallest frame comparison value among the plurality of frame comparison values and sets the detected image frame as the reference image.

Therefore, the reference image setting unit 111 detects the image frame of which a shaking degree is the least among the plurality of image frames included in the image data P1, and then, sets the detected image frame as the reference image.

Figure 6:
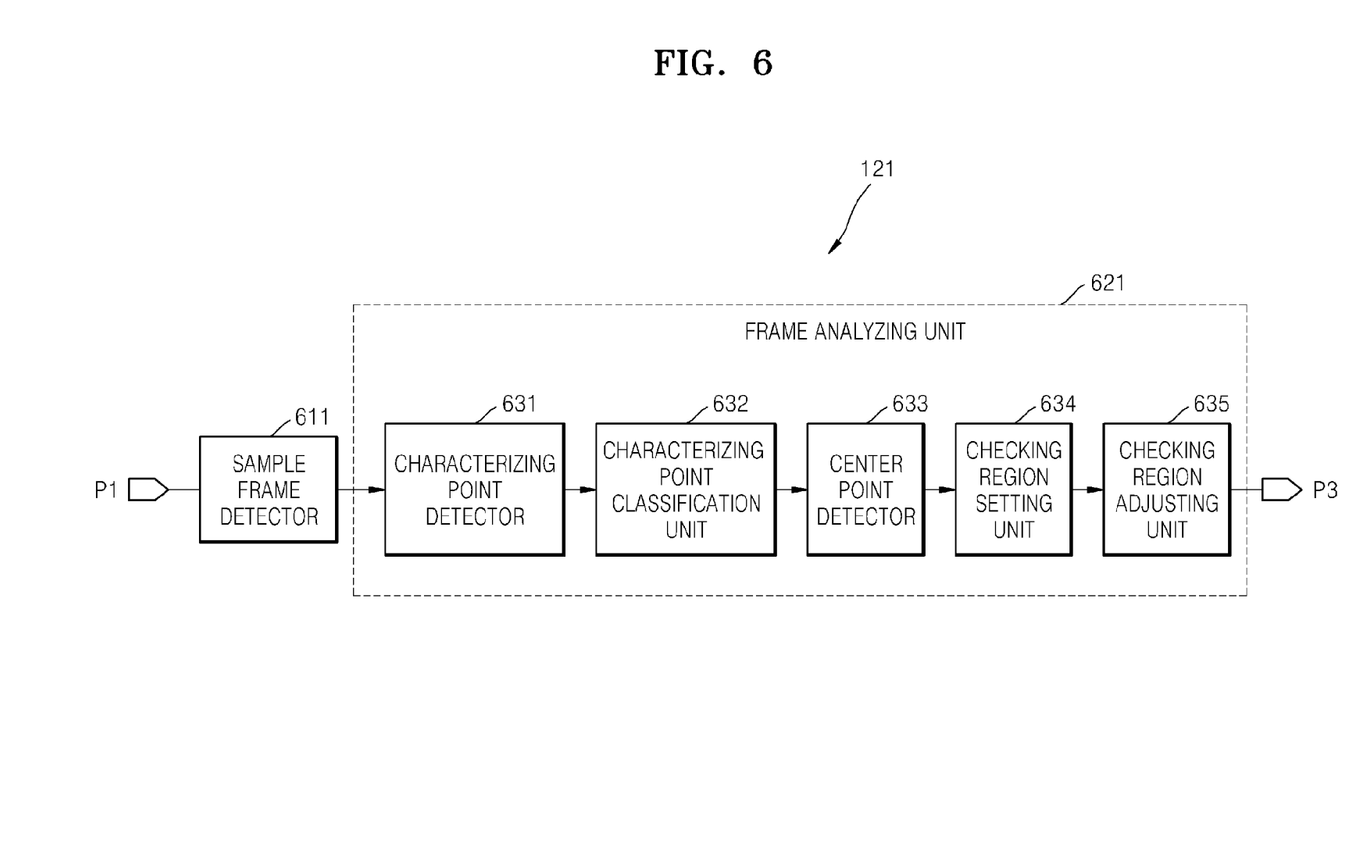
FIG. 6 is a detailed block diagram of a characterizing point checking region setting unit shown in FIG. 1, according to an exemplary embodiment.

FIG. 6 is a detailed block diagram of the characterizing point checking region setting unit 121 shown in FIG. 1. Referring to FIG. 6, the characterizing point checking region setting unit 121 includes a sample frame extract unit 611 and a frame analyzing unit 621. The sample frame extract unit 611 may be the sample frame extract unit 211 of the reference image setting unit 111.

The sample frame extract unit 611 receives the image data P1 from outside. The image data P1 includes a plurality of image frames that are generated by photographing an object continuously. The sample frame extract unit 611 extracts a plurality of image frames taken for a certain time period from the image data P1. The image data P1 generated by photographing the object with the camera includes hundreds to tens of thousands of image frames per second according to a performance of the camera. Therefore, the certain period of time may be set as one second or shorter if the shutter speed of the camera is fast, and may be set to be longer than one second if a shutter speed of the camera is slow. However, the present embodiment is not limited to this example.

The frame analyzing unit 621 receives the plurality of image frames that are extracted for the certain period of time from the sample frame extract unit 611. The frame analyzing unit 621 detects a plurality of characterizing points in the plurality of image frames, and sets an optimal characterizing checking region by using the plurality of characterizing points. The frame analyzing unit 621 outputs a signal P3 representing the characterizing point checking region.

The frame analyzing unit 621 includes a characterizing point detector 631, a characterizing point classification unit 632, a center point detector 633, a checking region setting unit 634, and a checking region adjusting unit 635.

The characterizing point detector 631 receives the plurality of image frames extracted for the certain period of time from the sample frame extract unit 611 and detects a plurality of characterizing points (921 of FIG. 9B) in each of the plurality of image frames. Specifically, the characterizing point detector 631 may detect the plurality of characterizing points in each of the plurality of image frames. Each of the plurality of characterizing points may be represented as coordinates. The image frame includes various characterizing elements, some of which may be detected as the characterizing points according to setting by the user. In order to detect the characterizing points of the image frame, a Harris' corner detection method, a SIFT algorithm, or an SURF algorithm may be used.

Figure 7:
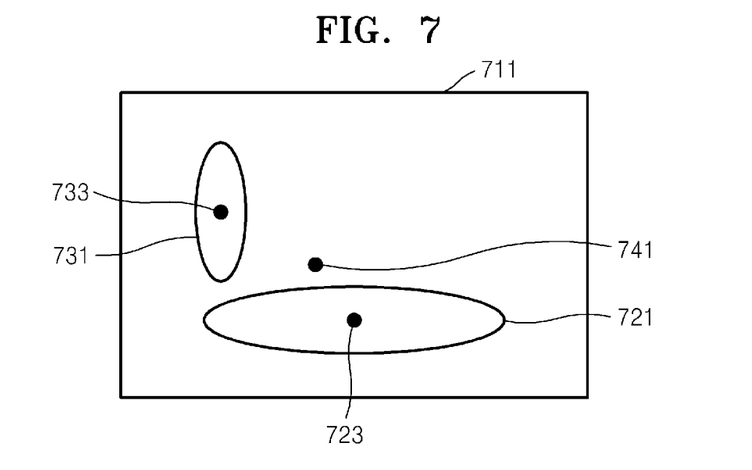
FIG. 7 is a diagram showing examples of detected centroid points according to an exemplary embodiment.

The characterizing point classification unit 632 classifies the plurality of characterizing points detected by the characterizing point detector 631 as a plurality of clusters (721 and 731 of FIG. 7), for example, a major cluster (721 of FIG. 7) and a minor cluster (731 of FIG. 7), for each of the image frames (711 of FIG. 7). The major cluster includes 50% or more characterizing points, and the minor cluster includes less than 50% of the characterizing points. As described above, since the major cluster includes more characterizing points than the minor cluster, the major cluster 721 may be wider than the minor cluster 731 as shown in FIG. 7. In order to classify the characterizing points as a plurality of clusters, a k-mean clustering method and a support vector machine (SVM) method may be used.

Figure 8A:
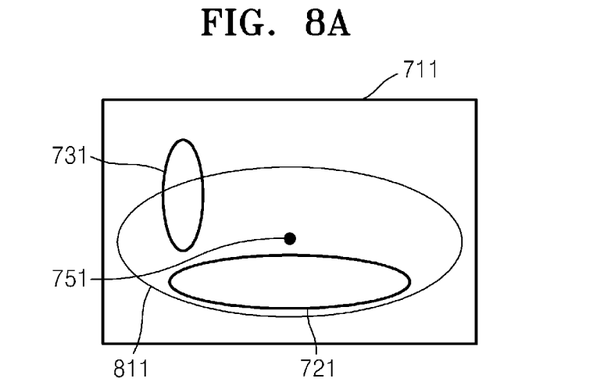
FIGS. 8A and 8B are diagrams illustrating a method of setting a characterizing point checking region, according to exemplary embodiments.

The center point detector 633 detects a centroid point (741 of FIG. 7) of the characterizing points in the plurality of image frames. To do this, the center point detector 633 detects a centroid point (723 of FIG. 7) of the major cluster 721 and a centroid point (733 of FIG. 7) of the minor cluster 731 that are classified by the characterizing point classification unit 632 in each of the image frames (711 of FIG. 7). The center point detector 633 calculates an average between the centroid point of the major cluster 721 and the centroid point of the minor cluster 731 to detect the centroid point in each of the image frames. The centroid point in each of the image frames is generally adjacent to the major cluster as shown in FIG. 7. The center point detector 633 calculates an average of the centroid points of the plurality of image frames, and detects a representative centroid point (751 of FIG. 8A) of the plurality of image frames, as shown in FIG. 8A. The average of the centroid points in the plurality of image frames may be calculated by summing the centroid points of the plurality of image frames, and dividing the sum by the number of image frames.

Figure 8B:
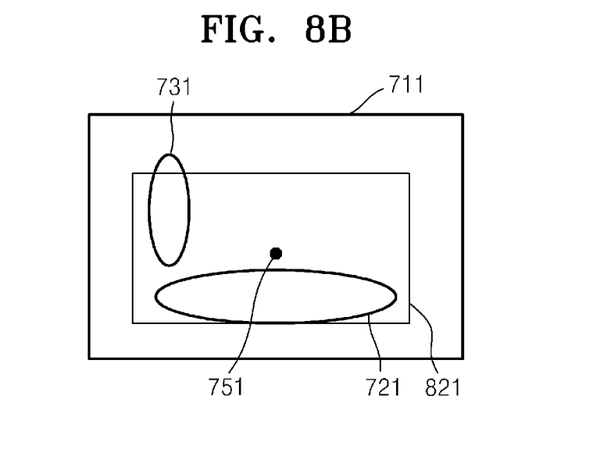

The checking region setting unit 634 sets a characterizing point checking region (811 of FIG. 8A or 821 of FIG. 8B) including all of the major clusters (721 of FIG. 7) of the plurality of image frames based on the representative centroid point (751 of FIG. 8A or 8B) detected by the center point detector 633, as shown in FIG. 8A or 8B. The characterizing point checking region 811 or 821 may be formed in various shapes, for example, may be formed as a region 811 denoted by a circle as shown in FIG. 8A or may be formed as a region 821 denoted by a square as shown in FIG. 8B.

Figure 9A:
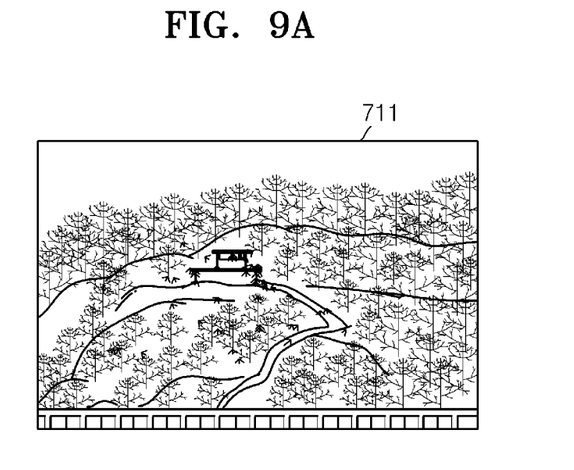
FIGS. 9A and 9B are diagrams of set optimal characterizing point checking regions according to an exemplary embodiment.
Figure 9B:
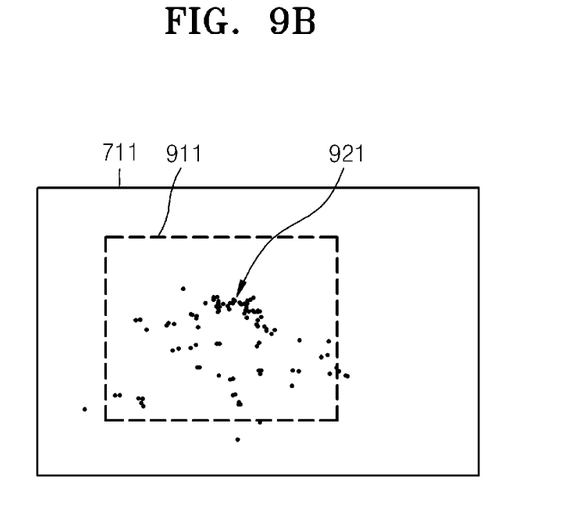

The checking region adjusting unit 635 identifies whether the characterizing point checking region 811 or 821 includes a standard level or greater of the characterizing points (921 of FIG. 9) of the image frames extracted for the certain period of time. The standard level may be set as 80% of the characterizing points 921. The checking region adjusting unit 635 expands the characterizing point checking region 811 or 821 so as to include the standard level of characterizing points, if the number of the characterizing points included in the characterizing point checking region 811 or 821 is less than the standard level. FIG. 9B shows a state where the adjustment is finished and an optimal characterizing point checking region 911 is set, and FIG. 9A shows one of the plurality of image frames currently input.

As described above, since the characterizing point checking region setting unit 121 sets the optimal characterizing point checking region 911, a time taken to test the characterizing points of the image stabilizing apparatus 100 may be greatly reduced.

Figure 10:
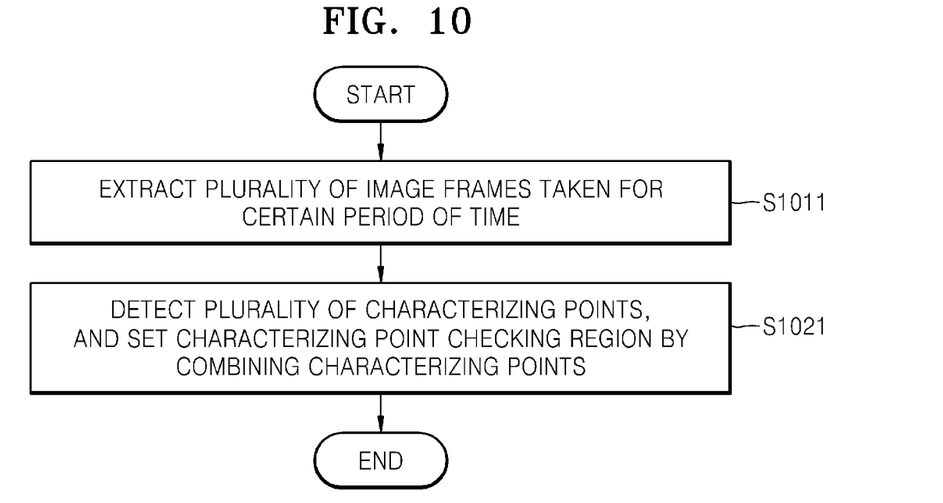
FIG. 10 is a flowchart illustrating a method of setting a characterizing point checking region performed by the characterizing point checking region setting unit shown in FIG. 6, according to an exemplary embodiment.

FIG. 10 is a flowchart illustrating a method of setting the characterizing point checking region performed by the characterizing point checking region setting unit 121 shown in FIG. 6, according to an exemplary embodiment. Referring to FIG. 10, the method includes operation S1011 and operation S1021.

In operation S1011, the characterizing point checking region setting unit (121 of FIG. 6) extracts a plurality of image frames taken for a certain period of time among the plurality of image frames included in the image data (P1 of FIG. 6) input from outside.

In operation S1021, the characterizing point checking region setting unit 121 detects a plurality of characterizing points (921 of FIG. 9) in the plurality of extracted image frames and sets the optimal characterizing point checking region (911 of FIG. 9) by using the plurality of characterizing points 921.

Figure 11:
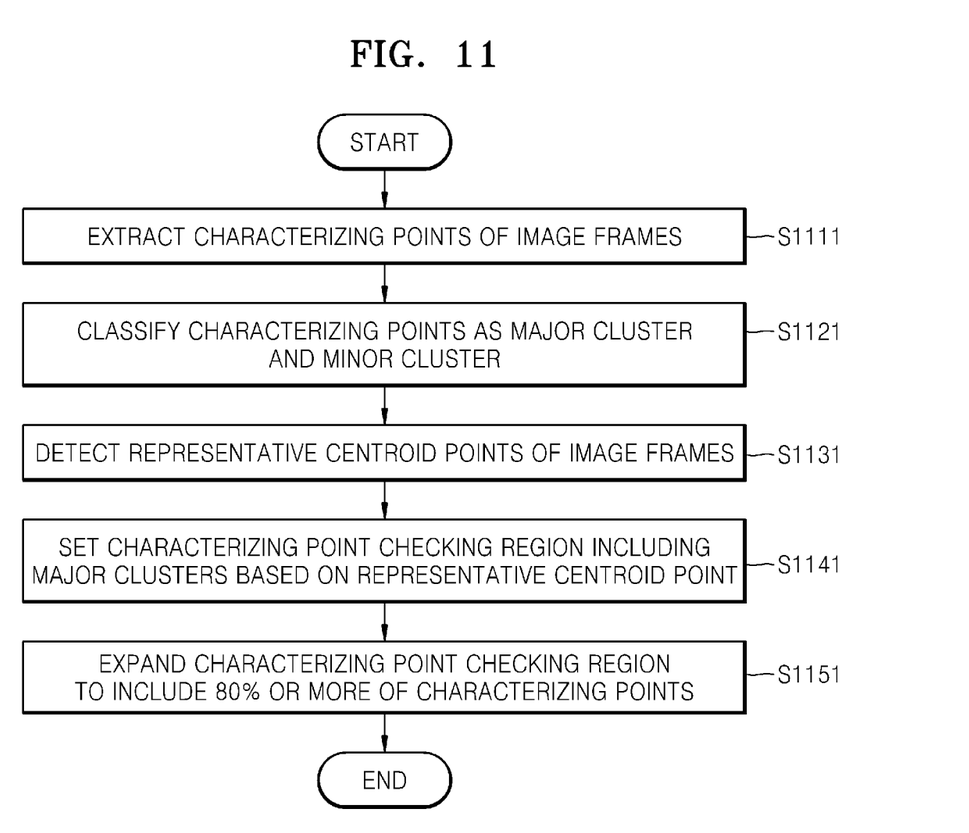
FIG. 11 is a flowchart illustrating a second operation of the method shown in FIG. 10 in detail, according to an exemplary embodiment.

FIG. 11 is a flowchart illustrating the operation S1021 shown in FIG. 10 in more detail, according to an exemplary embodiment. Referring to FIG. 11, the operation S1021 shown in FIG. 10 includes sub-operations S1111 through 1151.

In operation S1111, the characterizing point setting unit 121 extracts a plurality of characterizing points 921 from each of the plurality of extracted image frames.

In operation S1121, the characterizing point checking region setting unit 121 classifies the plurality of detected polarizing points 921 as a plurality of clusters (721 and 731 of FIG. 7), for example, the major cluster 721 and the minor cluster 731, for each of the image frames. The major cluster 721 is set to include 50% or greater of the characterizing points, and the minor cluster 731 is set to include less than 50% of the characterizing points.

In operation S1131, the characterizing point checking region setting unit 121 detects the representative centroid point (751 of FIG. 8) of the plurality of image frames. That is, the characterizing point checking region setting unit 121 detects the centroid points 723 and 733 from each of the plurality of clusters 721 and 731, and calculates the average of the centroid points 723 and 733 of the plurality of clusters 721 and 731 for each of the image frames to detect the centroid point 741 of each of the image frames. In addition, the centroid points 741 of the plurality of image frames are summed, and the sum is divided by the number of image frames to detect the representative centroid point 751 of the plurality of image frames.

In operation S1141, the characterizing point checking region setting unit 121 sets the characterizing point checking region (811 of FIG. 8A or 821 of FIG. 8B) that includes all of the major clusters 721 based on the representative centroid point 751.

In operation S1151, the characterizing point checking region setting unit 121 identifies whether the characterizing point checking region 811 or 821 includes the standard level of characterizing points 921 of the image frames extracted for the certain period of time or greater. When an amount of the characterizing points included in the characterizing point checking region 811 or 821 is less than the standard level, the characterizing point checking region setting unit 121 expands the characterizing point checking region 811 or 821 to include the standard level of characterizing points. The standard level may be set as 80% of the characterizing points 921. Therefore, the optimal characterizing point checking region 911 may be set.

As described above, the characterizing point checking region setting unit 121 sets the optimal characterizing point checking region 911 by using the plurality of image frames included in the image data P1 input from outside, and thus, a time that is taken to check the characterizing points of the image frames is greatly reduced.

Figure 12:
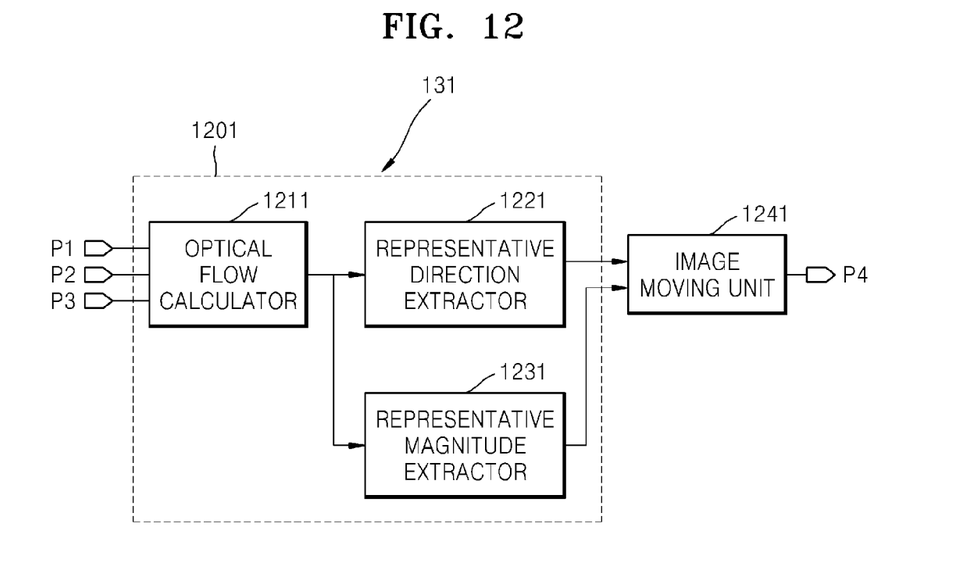
FIG. 12 is a detailed block diagram of an image adjusting apparatus shown in FIG. 1, according to an exemplary embodiment.

FIG. 12 is a detailed block diagram of the image adjusting unit 131 shown in FIG. 1. Referring to FIG. 12, the image adjusting unit 131 includes an image analyzing unit 1201 and an image moving unit 1241.

The image analyzing unit 1201 compares a current image frame included in the image data P1 input from outside with the predetermined reference image included in the reference image signal P2 and extracts a representative direction and a representative magnitude of shaking if the current image frame is shaken.

The image analyzing unit 1201 includes an optical flow calculator 1211, a representative direction extractor 1221, and a representative magnitude extractor 1231.

Figure 13:
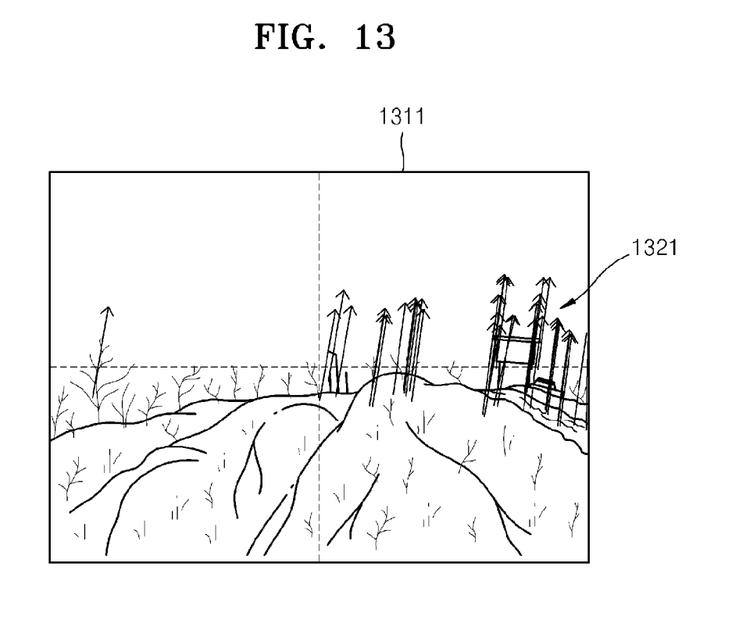
FIG. 13 is an image showing an example of an optical flow according to an exemplary embodiment.

The optical flow calculator 1211 compares the current image frame with the reference image to calculate an optical flow (1321 of FIG. 13) in the characterizing point checking region 911. As shown in FIG. 13, the optical flow 1321 has a direction and a magnitude. A method of calculating the optical flow 1321 is well known in the art, and thus, detailed descriptions thereof are not provided here. The reference image is an image frame of which a shaking degree is the least among the plurality of image frames taken for the certain period of time. The optical flow calculator 1211 may receive the reference image from the reference image setting unit shown in FIG. 2. The method of setting the reference image is described above with reference to FIGS. 2 through 5.

The representative direction extractor 1221 receives the optical flow 1321 calculated by the optical flow calculator 1211. The representative direction extractor 1221 extracts a representative shaking direction of the currently input image frame from the optical flow 1321. The shaking direction of an image frame may be set in eight directions, for example, an east direction, a west direction, a south direction, a north direction, a south-east direction, a north-east direction, a south-west direction, and a north-west direction. The representative direction extractor 1221 determines which one of the eight directions is the representative direction of the optical flow 1321 and sets the determined direction as the representative direction of the currently input image frame. The shaking direction of the image may be divided in more detail, for example, 12 directions, 24 directions, or 36 directions.

The representative magnitude extractor 1231 receives the optical flow 1321 calculated by the optical flow calculator 1211. The representative magnitude extractor 1231 extracts a representative shaking magnitude of the currently input image frame from the optical flow 1321. The representative shaking magnitude of the image frame may be obtained by converting magnitudes of the optical flow having the representative shaking direction into a histogram, and averaging vectors included in a range having the largest number of bins in the histogram.

The image moving unit 1241 moves the currently input image frame as much as the representative magnitude extracted by the representative magnitude extractor 1231 in an opposite direction to the representative direction extracted by the representative direction extractor 1221. That is, the image moving unit 1241 moves the currently input image frame as much as the magnitudes of Table 1 below in the directions shown in Table 1. In Table 1, minus (−) denotes the opposite direction, and the representative directions are the directions shown in FIG. 14.

TABLE 1

Figure 14:
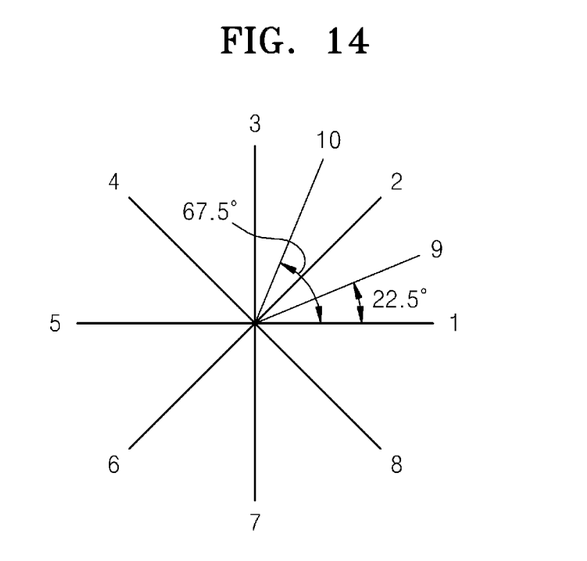
FIG. 14 is a diagram showing representative directions of the optical flow according to an exemplary embodiment.

| Representative direction | coordinates of moving current image frame (X-axis, Y-axis) |
|---|---|
| 1 | −representative magnitude, 0 |
| 2 | −(representative magnitude/√2), −(representative magnitude/√2) |
| 3 | 0, −representative magnitude |
| 4 | (representative magnitude/√2), −(representative magnitude/√2) |
| 5 | representative magnitude, 0 |
| 6 | (representative magnitude/√2), (representative magnitude/√2) |
| 7 | 0, representative magnitude |
| 8 | −(representative magnitude/√2), (representative magnitude/√2) |

Figure 15:
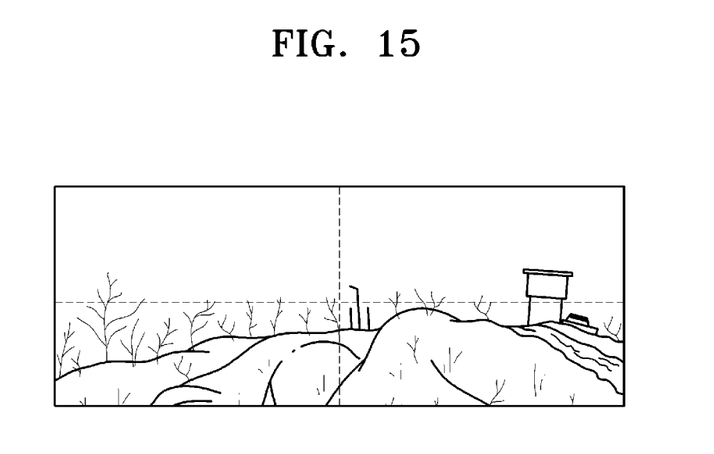
FIG. 15 is an image showing a state where an image is adjusted according to an exemplary embodiment.

Referring to Table 1, the image moving unit 1241 moves the current image frame on the X-axis as much as the representative magnitude in the opposite direction to the representative direction, when the representative direction is an X-axis (1, 5). In addition, the image moving unit 1241 moves the current image frame on the Y-axis as much as the representative magnitude in the opposite direction to the representative direction when the representative direction is a Y-axis (3, 7). However, when the representative direction is a diagonal direction (2, 4, 6, 8), the image moving unit 1241 moves the current image frame in a diagonal line as much as (representative magnitude/√2) in the opposite direction by using trigonometric functions. After that, at least one of the four sides of the moved current image frame may be trimmed in consideration of the representative direction and the representative magnitude. Therefore, the image may be stabilized as shown in FIG. 15. The image moving unit 1241 outputs a signal P4 representing the stabilized image.

Figure 16A:
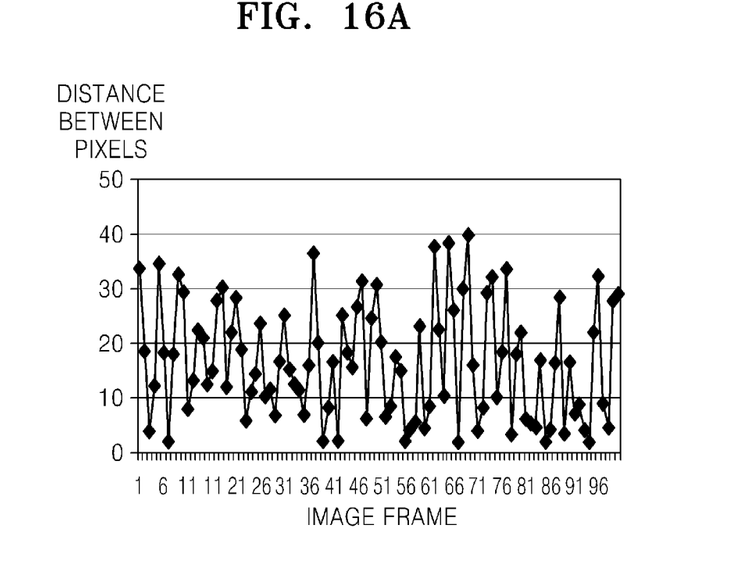
FIGS. 16A and 16B are graphs showing shaken degrees of an image, according to an exemplary embodiment.
Figure 16B:
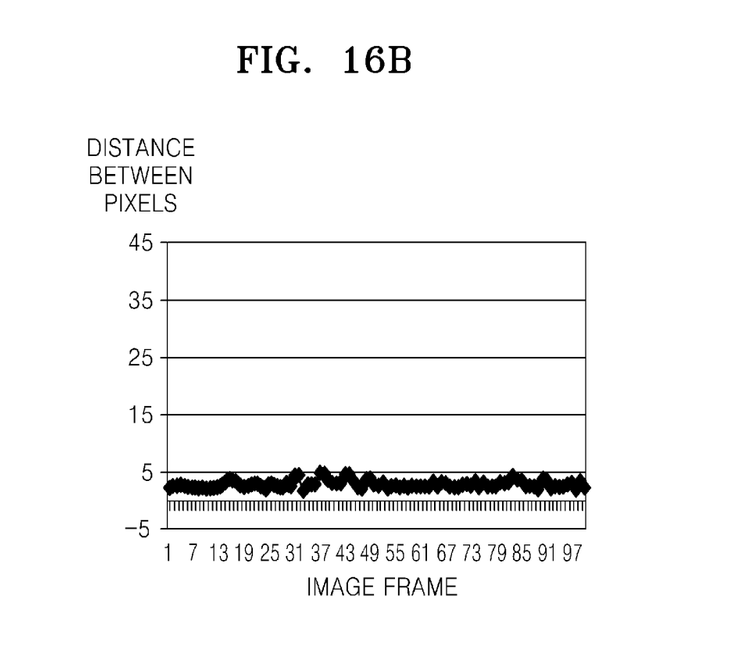

FIGS. 16A and 16B are graphs showing shaken degrees of image frames. FIG. 16A shows the shaken degrees of the image frames before stabilization, and FIG. 16B shows the shaken degrees of the image frames after stabilization.

Referring to FIG. 16A, large deviation is shown between locations of pixels in the image frames. That is, FIG. 16A shows a state where the image frames are severely shaken and are unstable.

Referring to FIG. 16B, small deviation is shown between locations of the pixels in the image frames. That is, FIG. 16B shows a state where the image frames are stabilized.

As described above, the optical flow of the currently input image frame input to the image adjusting unit 131 is calculated to extract the representative direction and the representative magnitude of the image frame. Then, if the image frame is shaken, the image frame is moved as much as the representative magnitude in the opposite direction to the representative direction. Thus, the shaking may be corrected and the image frame may be stabilized.

Figure 17:
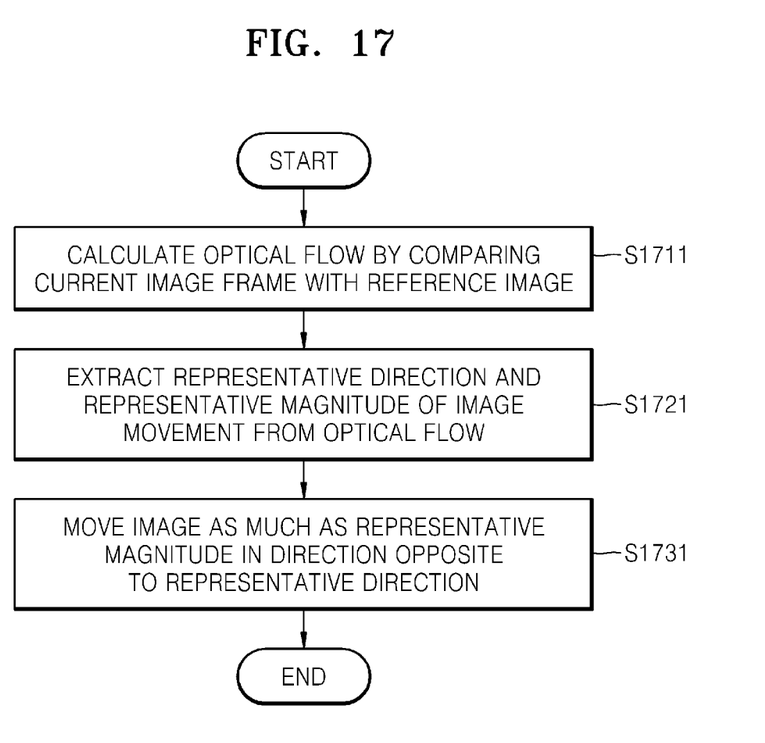
FIG. 17 is a flowchart illustrating a method of adjusting an image performed by the image adjusting apparatus of FIG. 12, according to an exemplary embodiment.

FIG. 17 is a flowchart illustrating a method of adjusting the image by the image adjusting unit 131 shown in FIG. 12, according to an exemplary embodiment. Referring to FIG. 17, the method of adjusting the image includes operations S1711 through S1731.

In operation S1711, the image adjusting unit 131 compares the current image frame input from outside with the preset reference image to calculate the optical flow (1321 of FIG. 13). The reference image is input from outside to the image adjusting unit 131.

In operation S1721, the image adjusting unit 131 extracts the representative direction and the representative magnitude of shaking of the currently input image from the optical flow 1321.

In operation S1731, the image adjusting unit 131 moves the image frame that is currently input as much as the representative magnitude in the opposite direction to the representative direction. In more detail, if the representative direction is an X-axis direction, the image adjusting unit 131 moves the current image frame as much as the representative magnitude in the opposite direction to the representative direction on the X-axis. If the representative direction is a Y-axis direction, the image adjusting unit 131 moves the current image frame as much as the representative magnitude in the opposite direction to the representative direction on the Y-axis. However, when the representative direction is a diagonal direction, the image adjusting unit 131 moves the current image frame as much as (representative magnitude/$\sqrt{2}$) in the opposite direction to the representative direction on the diagonal line. After that, at least one of the four sides of the moved current image frame may be trimmed in consideration of the representative direction and the representative magnitude. Therefore, the shaking is corrected, and the stabilized image may be obtained as shown in FIG. 15.

According to the above exemplary embodiments, the characterizing point checking region is set in the image frame that is currently input, and the currently input image frame is compared with the preset reference image to determine the shaking degree of the currently input image frame. Then, the image frame is adjusted as much as the shaking amount when the currently input image frame is shaken.

Therefore, the image may be optimally stabilized.

While the exemplary embodiments have been particularly shown and described with reference to the drawings, it will be understood by those of ordinary skill in the art that various changes in form and details may be made therein without departing from the spirit and scope of the inventive concept as defined by the following claims.

What is claimed is:

1. An image stabilizing apparatus comprising:
at least one hardware processor which implements:
an image adjusting unit which:
sets a characterizing point checking region in a currently input image frame,
compares the currently input image frame with a reference image to determine whether the currently input image frame is shaken, based on the reference image and the characterizing point checking region, and
adjusts the currently input image frame by a shaking amount if it is determined that the current image frame is shaken;
a reference image setting unit which extracts an image frame which is a least shaken among a plurality of image frames included in image data taken for a certain period of time, and sets the extracted image frame as the reference image; and
a characterizing point checking region setting unit which sets the characterizing point checking region by using a plurality of characterizing points in the plurality of image frames,
wherein the least shaken image frame is set as the reference image by using a distance between a center point and the plurality of characterizing points in each of the plurality of image frames.

2. The image stabilizing apparatus of claim 1, wherein the characterizing point checking region is set by analyzing the plurality of characterizing points in each of the plurality of image frames using a centroid of the plurality of characterizing points in each of the plurality of image frames.

3. An image stabilizing apparatus comprising:
at least one hardware processor which implements an image adjusting unit which:
sets a characterizing point checking region in a currently input image frame,
compares the currently input image frame with a reference image to determine whether the currently input image frame is shaken, based on the reference image and the characterizing point checking region, and
adjusts the currently input image frame by a shaking amount if it is determined that the current image frame is shaken,
wherein a least shaken image frame is set as the reference image by using a distance between a center point and the plurality of characterizing points in each of the plurality of image frames.

4. The image stabilizing apparatus of claim 3, wherein the characterizing point checking region is set by analyzing the plurality of characterizing points in each of the plurality of image frames using a centroid of the plurality of characterizing points in each of the plurality of image frames.

* * * * *